INVENTORS
HUBERT BILDSTEIN
GERHARD STOLBA
KARL KNOTIK

3,468,985
METHOD FOR THE PRODUCTION OF SPHERICAL PARTICLES

Hubert Bildstein, Vienna, Karl Knotik, Siegendorf, and Gerhard Stolba, Vienna, Austria, assignors to Osterreichische Studiengesellschaft fur Atomenergie G.m.b.H., Vienna, Austria
Filed July 7, 1966, Ser. No. 563,530
Claims priority, application Austria, July 8, 1965,
A 6,228/65
Int. Cl. G21c 21/02; B29b 1/03
U.S. Cl. 264—.5    10 Claims

ABSTRACT OF THE DISCLOSURE

A process for the production of spherical particles, in which the starting material for forming the particles is preferably selected from a nuclear fuel material such as a metal or metal compound of uranium, thorium and plutonium but the starting material may also be selected from the transition metals in groups $4b$, $5b$, and $6b$ of the Periodic Table, and comprising the steps of melting a binder material, such as paraffin, and mixing the starter material in powderous form into the melt of the binder material for forming a suspension, spraying the suspension of the starting material and the binder, while it is maintained at an elevated temperature above the melting temperature of the binder, to form droplets, and cooling the droplets to below the melting temperature of the binder for completing the formation of the spherical particles. After their formation the spherical particles are mixed with an inert powdery medium, filled into a melting crucible, and the binder material is removed by heating the particles and evaporating the binder material. Before this processing of the spherical particles, a crackable substance, such as a sugar solution, may be used to coat the particles to prevent their collapse. The spherical particles may be combined with carbon powder or other materials for providing a specific form of the spherical particle, such as a carbide or oxide.

---

The invention concerns a method for the production of spherical particles, preferably from nuclear fuel materials. The invention is characterised in that, using the initial material of the particles, a fluid mix is formed and this mix is then sprayed or allowed to drain off, the drops formed thereby being solidified during their sinking under gravitation and then if desired dried and converted into another compound.

The method according to the invention is particularly suitable for the production of spherical particles from metals or metal compounds.

For the production of the fluid mix from the initial material, emulsions or suspensions may conveniently be built up in solvents.

Figure 2:
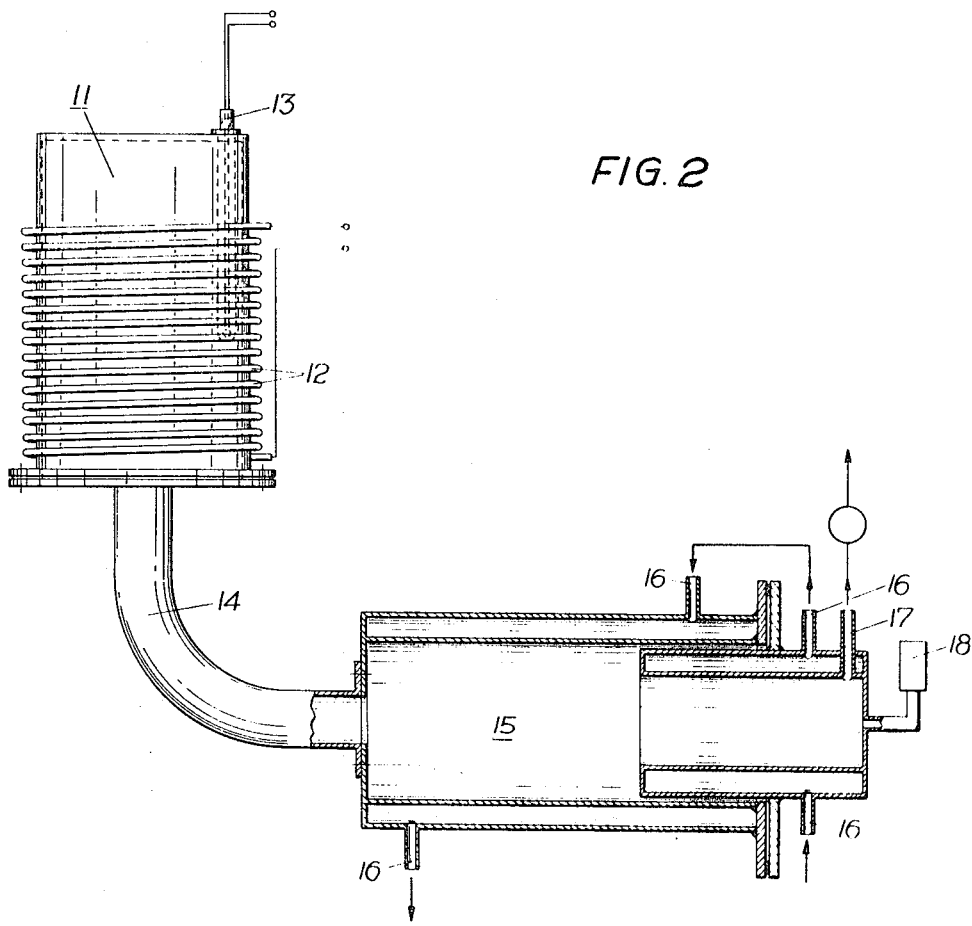
Figure 1:
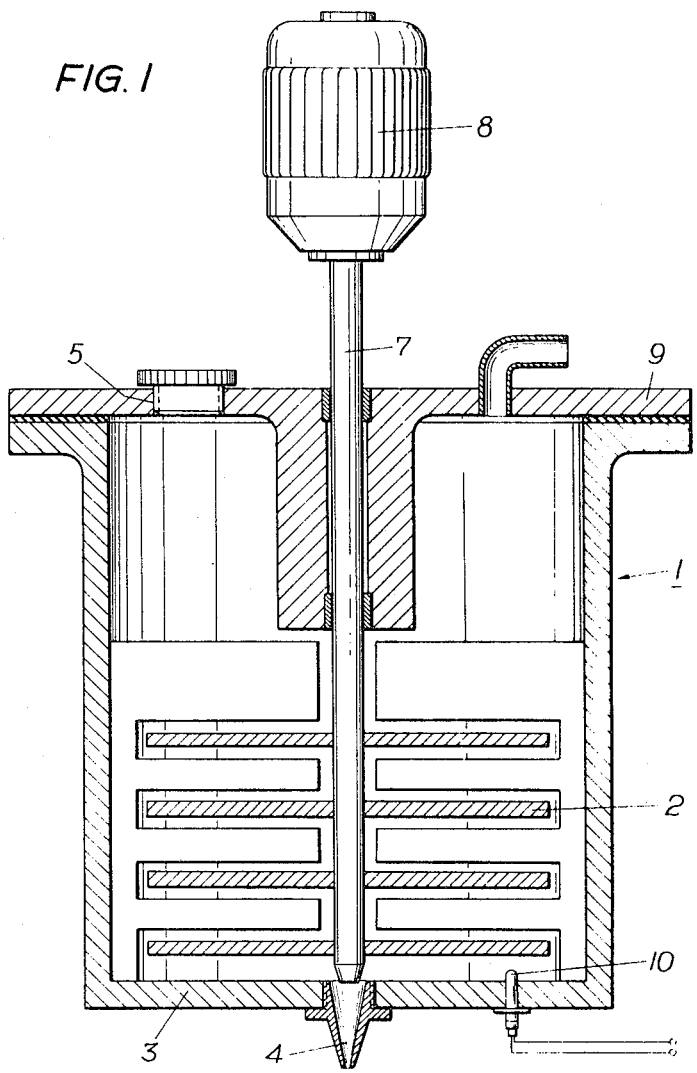

Apparatus for carrying out the method is shown by way of example only in the accompanying drawings in which:

FIG. 1 shows an apparatus for the spraying of the fluid mix and FIG. 2 shows a plan for the de-waxing of the particles.

One embodiment of the method according to the invention is described below with reference to a suspension of powdery metal oxide and carbon in a bonding agent. A mixture of powder having a grain size of less than 40 μm. is stirred into a paraffin melt and then sprayed. Part only of the carbon necessary for carburation is mixed in the form of graphite powder, coal powder, or soot, and in an amount of 20 to 75% of the stoichiometric proportion. The remaining carbon is only on subsequent carburation of the particles taken up from the latter. The paraffin content of the suspension can amount to between 20 and 80% by weight of the oxide-graphite weight.

A typical arrangement is for example 1620 gm. $UO_2$ 216 gm. carbon and 1100 gm. paraffin.

The hard paraffin which has a melting interval from 68 to 72° C. is heated up to about 150° C. whereupon the powder is stirred in portions into this melt. This mix is now filled into a spraying apparatus and sprayed to form drops.

FIG. 1 shows an apparatus for carrying out the spraying. It consists in the main of a container 1 which can be heated, and can be closed and made pressure tight. The container has a stirring mechanism 2, which is driven by an electric motor 8 by means of an axle 7 which passes through the lid 9 of the container. The suspension is held at a temperature of about 180° C. by means of an automatic temperature control. A temperature senser is marked 10. An aperture 5 is formed in the lid 9 through which the melt-suspension can be fed into the container. A nozzle 4 is located in the base 3. The spraying pressure necessary is provided by compressed air and is so adjusted by means of a precision control valve that the jet produced receives just sufficient turbulence in the nozzle 4 so that on exit it is divided into two or three branches and subsequently sprayed into drops. These are collected in a Dewar vessel which is filled with liquid nitrogen or liquid air. The particles harden in this vessel and can be removed by lifting out a sieve base set in the Dewar vessel. The particles so obtained can then be sieved into, under and over grains and further worked. In order to prevent the drops running together into large lumps on the surface of the liquid in the cold bath, the contents of the vessel must be vigorously stirred.

If the drops of melt are caught in a bath of slack water, then the particles must be dried before sieving.

For a throughput of 3026.4 gm. of a $UO_2$—C paraffin mixture the following distribution of the particles according to size and weight resulted.

| Weight in g. | Particles $\phi$ in mm. | Proportional weight in percent |
|---|---|---|
| 50.8 | >1.4 | 1.7 |
| 1,422.5 | 1.0–1.4 | 47.2 |
| 1,458.1 | 0.5–1.0 | 48.0 |
| 95.0 | <0.5 | 3.1 |
| 3,026.4 | | 100.0 |

The particles of undesired sizes can be immediately re-melted and fed back into the process.

The spray particles thus obtained are mixed with a substantially equal volume of graphite powder, coal powder or soot having a grain size below 40 μm. filled into a graphite crucible and de-paraffined in a vacuum oven.

FIG. 2 shows a plant for carrying out the de-paraffination. The oven 11 consists of an electrically heated bell. The leads for the electric heating device are marked 12. Control of the heating takes place by means of a thermosensitive element 13. The bell is connected by means of a metal hose 14 to a water-cooled receiver 15. The plant is evacuated by means of a pump (Kapselpumpe) which is attached at 17. A hollow spring vacuum meter 18 serves as the pressure indicator. Cold water pipes are marked 16.

The de-waxing of the particles has to take place with a certain precision and the following three steps should be given particular care:

(1) Heating of the crucible up to a maximum of 500° C., heating up time 0.5 hour.

(2) Switching the vacuum pump up to full efficiency, 0.5 hour after attainment of maximum temperature.

(3) Finishing the process, 0.5 hour after setting the pump on full efficiency at 500° C.

Too rapid evacuation and too high temperatures cause the particles to collapse and with carbide melts; the result is to form powdery $UC_2$ crystallite. Sudden evaporation of the paraffin and the setting in of a reaction at 600° C. between $UO_3$ and carbon could be the cause of this. The reaction between $UO_2$ and carbon first sets in at 1200 to 1300° C., yet a certain proportion of $UO_3$ will be present in $UO_2$, produced.

In order to prevent collapse of the spray particles on heating and pumping away of the bonding agent, the particles can be coated with suitable crackable substances. Moistening of the particles with a sugar solution before embedding in the bed of coal powder, for example, has proved very suitable.

After de-waxing, the graphite bed or the soot bed is filled up with fresh graphite or soot which however is not mixed with the contents of the crucible, in order to prevent mechanical destruction of the heated particles. These are now changed, in the same crucible and in atmosphere of an inert gas (argon) into carbide particles, in a high temperature oven. It is convenient to use an inductively heated oven as with this type of oven the temperatures can be accurately controlled and reproduced.

The possible production was determined in an inductive Balzer oven. Each time charges of 15 g. "green" particles were inserted, in the grain sizes 0.5 to 0.65, 0.63 to 0.8, and 0.8 to 1.0.

The following results were obtained:

| "Green" Particles $\phi$ in mm. | $UO_2$-particles, Weight in g. | Particles in mm. | Proportional Weight in percent |
|---|---|---|---|
| 0.500–0.630 | 0.6 | 0.315–0.430 | 7.0 |
| | 7.1 | 0.250–0.315 | 82.6 |
| | 0.9 | <0.250 | 10.4 |
| | 8.6 | | 100.0 |
| 0.630–0.800 | 6.3 | 0.315–0.430 | 72.4 |
| | 1.8 | 0.250–0.315 | 20.7 |
| | 0.6 | <0.250 | 6.9 |
| | 8.7 | | 100.0 |
| 0.800–1.00 | 3.3 | 0.430–0.630 | 28.8 |
| | 4.4 | 0.315–0.430 | 51.8 |
| | 0.8 | <0.315 | 19.4 |
| | 8.5 | | 100.0 |

The test samples are heated up in 45 minutes to 2000° C. The temperature is raised during the course of 10 minutes from 2000° to 2550° C. The temperature rises at the same feed of current, over 5 minutes to 2600° C. Subsequently the heating is shut off and the crucible allowed to cool in the inert gas atmosphere.

Charges of homogenous particles of desired sizes can be obtained relatively easily if on the production of the spray drops a loss in volume of approximately 40% is allowed for in the melting process. Particles of unsuitable sizes are thermically oxidised and can be fed back into the process as ground oxide. There is however also the possibility of inserting crushed carbide particles in place of oxide carbon powder. To raise the temperature of the paraffin melt, artificial wax may be added. This is cheap and readily obtainable.

The embodiment of the invention just described is related in the main to uranium and thorium. However, in the same way other metals such as for example plutonium, and the transition metals, especially those of group 4b-, 5b and 6b of the periodic system can be treated in a similar manner. Thus spherical particles have already been produced with great success from molybdenum, zirconium and tungsten.

Materials other than those set out should in the same way produce good results.

It is of course also possible to use bonding agents other than paraffin, for example resin. Should the spray particles not have to be worked in carbides but formed into particles as oxide or other metals, then they must be brought into an inert powdery medium, an oxide powder or metal powder for example aluminium-oxide powder, tungsten metal powder for the removal of the bonding agent. The agent can then be removed in the manner explained previously. Thereafter the particles are melted or sintered at the corresponding temperature in the same bed or sintered in loose heaping.

What we claim is:

1. A process for the production of spherical particles formed of an initial material comprised of a metal or metal compound selected from the group consisting of uranium, thorium, plutonium, and the transition metals in groups 4b, 5b, and 6b of the periodic system, and comprising the steps of melting a binder material, mixing the initial material in a powderous form into the melt of the binder material for forming a suspension wherein the binder material is in the range of 20 to 80% by weight of the weight of the suspension materials, maintaining the suspension in a heated condition above the temperature at which the binder material melts and spraying the suspension to form individual droplets, cooling the individual droplets to below the meltng temperature of the binder for forming spherical particles from the suspension material, removing the binder material from the spherical particles by heating the spherical particles, and evaporating the binder material.

2. A process as set forth in claim 1, comprising the step of moistening the spherical particles with a crackable substance before the removal of the binder material to prevent collapse of the spherical particles during the removal of the binder material.

3. A process as set forth in claim 1, wherein the starting mateiral is uranium oxide in a powdered form mixed with carbon is a powdered form and the mixture having a grain size of less than 40 microns, the binder material is paraffin having a melting interval of 68°–72° C. and wherein the paraffin is heated to about 150° C. for forming a suspension with the mixture of uranium oxide-carbon, and heating and heating and miantaining the suspension at about 180° C. during the spraying operation.

4. A process as set forth in claim 3, wherein the step of removing the paraffin binder material from the spherical particles is effected by placing the spherical particles in a closed vessel containing a vacum pump and heating the vessel up to a maximum temperature of 500° C. in about 0.5 hour, actuating the vacuum pump up to its full efficiency about 0.5 hour after reaching the maximum temperature, and completing the removal of the paraffin binder material 0.5 hour after the vacuum pump is at its full efficiency at the maximum temperature of 500° C.

5. A process as set forth in claim 4, comprising the step of placing the spherical particles after the removal of the binder material into a crucible containing an inert gas atmosphere, and heating the crucible in a high temperature oven for forming carbide particles.

6. A process as set forth in claim 5, wherein the step of heating the crucible comprises heating the crucible to 2000° C. in about 45 minutes, raising the temperature in the crucible from 2000 to 2550° C. in about 10 minutes, raising the temperature from 2550° C. to 2600° C. in 5 minutes and then shutting off the source of heat and allowing the crucible to cool in the inert gas atmosphere.

7. A process as set forth in claim 1, wherein after the formation of the spherical particles, mixing the spherical particles with a substantially equal volume of inert powdery medium having a grain size below 40 microns, filling the mixture into a melting crucible and then proceeding with the step of removing the binder material from the spherical particles.

8. A process as set forth in claim 7, wherein the inert powdery medium is selected from one of the group consisting of graphite powder, coal powder, and soot.

9. A process for the production of spherical particles formed of an initial material comprised of a metal or metal compound selected from the group consisting of uranium, thorium, plutonium, and the transition metals in groups 4b, 5b, and 6b of the periodic system, and comprising the steps of melting a binder material, mixing the initial material in a powderous form into the melt of the binder material for forming a suspension, spraying the suspension to form individual droplets, cooling the individual droplets to below the melting temperature of the binder for forming spherical particles, and moistening the spherical particles with a sugar solution to prevent collapse of the spherical particles upon subsequent treatment for the removal of the binder material.

10. A process for the production of spherical particles formed of an initial material comprised of a metal or metal compounds selected from the group consisting of uranium, thorium, plutonium, and the transition metals in groups 4b, 5b, and 6b of the periodic system, and comprising the steps of melting a paraffin binder material having a melting interval of 68°–72° C. to about 150° C. and mixing the initial material in a powderous form into the melt of the binder material for forming a suspension, spraying the suspension to form inidvidual droplets, cooling the individual droplets to below the melting temperature of the binder material for forming spherical particles, and removing the paraffin binder material from the spherical particles by placing the particles in a closed vessel containing a vacuum pump and heating the vessel up to a maximum temperature of 500° C. in about 0.5 hour, actuating the vacuum pump up to its full efficiency about 0.5 hour after reaching the maximum temperature, and completing the removal of paraffin binder material 0.5 hour after the vacuum pump is at its full efficiency at the maximum temperature of 500° C.

References Cited
UNITED STATES PATENTS

| | | | |
|---|---|---|---|
| 2,818,605 | 1/1958 | Miller | 264—.5 |
| 2,933,766 | 4/1960 | Bickford et al. | 264—.5 |
| 3,137,742 | 6/1964 | Sowden | 264—.5 |
| 3,171,815 | 3/1965 | Kelley et al. | 264—.5 |
| 3,252,755 | 5/1966 | Delange et al. | 264—.5 |
| 3,290,122 | 12/1966 | Clinton et al. | 264—.5 |
| 3,313,602 | 4/1967 | Smith et al. | 264—.5 |
| 3,321,560 | 5/1967 | Wilkinson | 264—.5 |

REUBEN EPSTEIN, Primary Examiner

M. J. SCOLNICK, Assistant Examiner

U.S. Cl. X.R.

75—.5; 252—301.1; 264—13